Dec. 1, 1953  W. D. DAIN  2,661,046
CUTTING AND SPLICING APPARATUS
Filed Sept. 17, 1951  2 Sheets-Sheet 2
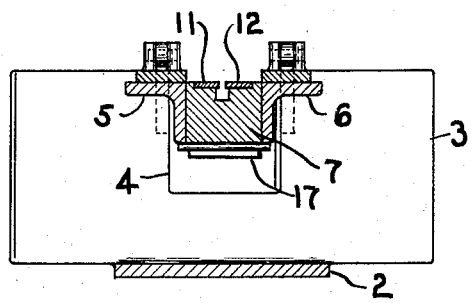
Fig-III
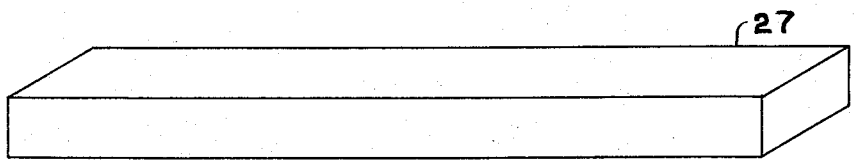
Fig-V
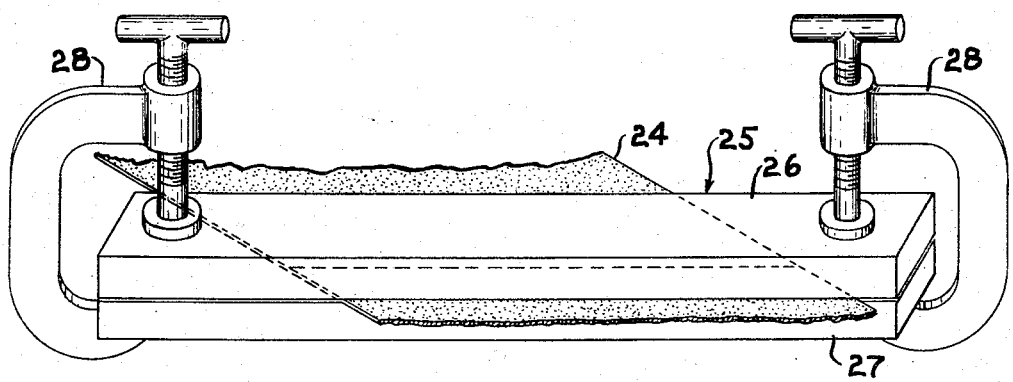
Fig-IV
INVENTOR
William D. Dain
BY Roy A. Plant
ATTORNEY Patented Dec. 1, 1953

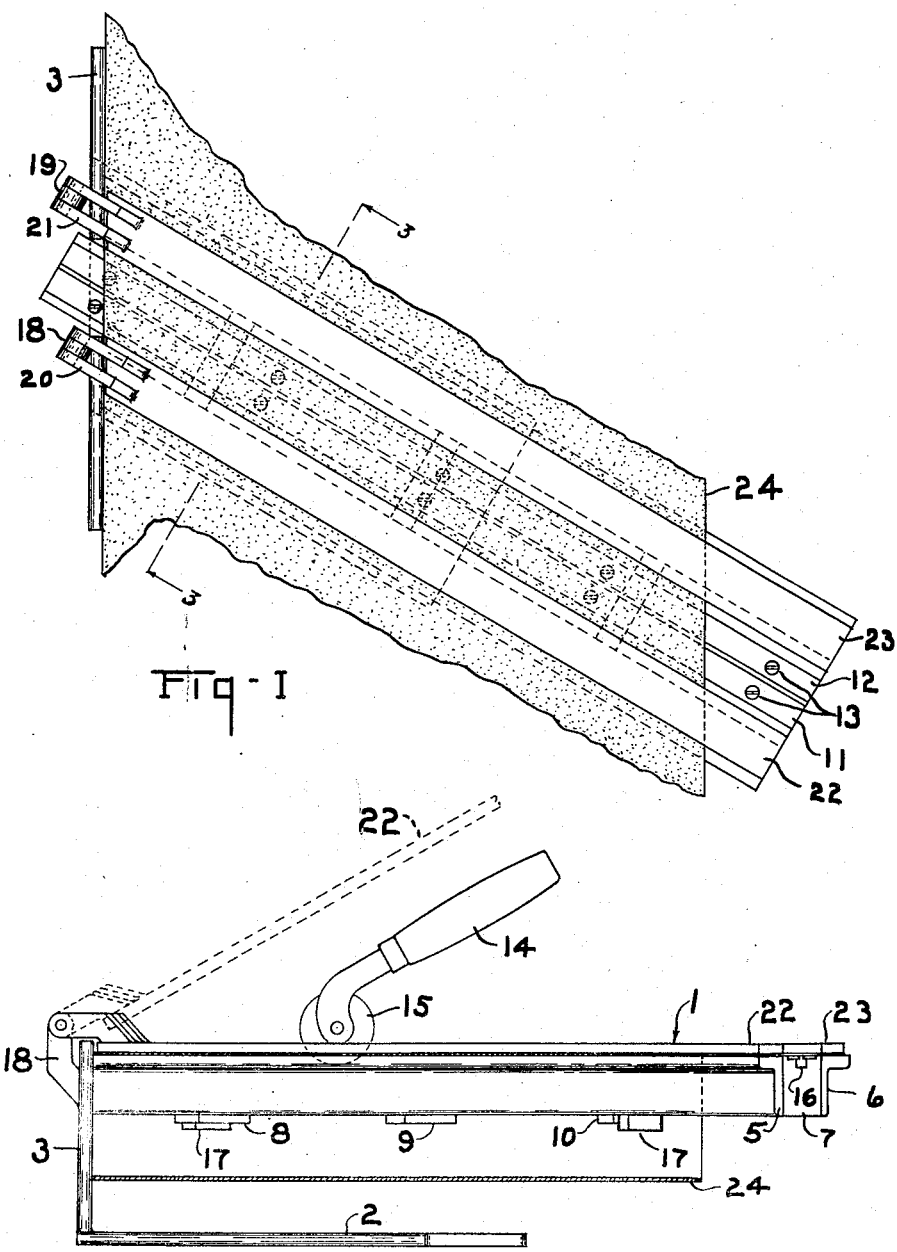

2,661,046

UNITED STATES PATENT OFFICE 2,661,046

CUTTING AND SPLICING APPARATUS

William D. Dain, Bellevue, Mich., assignor to Econaway Manufacturing Company, Bellevue, Mich.

Application September 17, 1951, Serial No. 246,910

9 Claims. (Cl. 154—42)

The present invention relates broadly to cutting and splicing apparatus, and in its specific phases to an apparatus particularly adapted for use in the making of endless sanding belts by the cutting to length and splicing of suitable sanding belt stock.

Prior to the advent of the cutting and splicing apparatus set forth in my co-pending patent application Serial No. 175,785, now Patent No. 2,575,798, filed July 25, 1950, and of which the present invention is an improvement, almost all endless sanding belts used by cabinet shops, furniture factories, et cetera, were obtained as the product of companies producing sanding belt stock. That stock is also purchasable in rolls, and some buyers made endless sanding belts out of it as best they could on their work benches, or otherwise, since there was no cutting and splicing apparatus on the market designed to meet this specific problem. The apparatus set forth in my above noted prior patent application met with an instant demand as soon as it came onto the market, and in the production and testing of same it became apparent that improvements were desirable in order to simplify and facilitate the easy production of accurate and thoroughly satisfactory sanding belt splices. It was the recognition of this situation which lead to the conception and development of the present invention.

Accordingly among the objects of the present invention is the provision of a simplified cutting and splicing apparatus particularly adapted for use in connection with the production of endless sanding belts.

Another object of the present invention is the provision of an apparatus adapted to accurately guide the side edges of both of the sanding belt ends being spliced, and to provide a clear space between the splicing portion of the assembly and the base of the assembly so that the return run of the belt being spliced can pass therebetween for ease of handling.

Another object of the present invention is to provide the apparatus with a back plate against which the side of the return run of the belt and the like side of the ends being spliced together can be held to simplify making a splice which will be true so that the finished belt will run properly in the sanding machine.

A further object is to provide a pair of hinged clamping arms for holding the belt firmly when being cut to length, and also to hold the belt ends during the cementing and splicing steps.

A further object is to provide a special removable knife guide member having guide plates for the knife and a recess thereunder for the cuttings which are produced during the cutting operation.

A further object is to provide the cutting and splicing apparatus with a knife guide member which can be removed and replaced with a lower clamping member substantially the same size, and on which the splicing can take place followed by the supplying of an upper clamping member adapted to be placed over the splice on the lower clamping member and gripped thereto by any suitable means such as a pair of C-clamps.

Still further objects and advantages of the present invention will appear as the description proceeds.

To the accomplishment of the foregoing and related ends, the invention, then, consists of the improved cutting and splicing apparatus hereinafter fully described and particularly pointed out in the claims, the annexed drawings and the following description setting forth in detail certain means for carrying out the invention, such disclosed means illustrating, however, but one of the various ways in which the principle of the invention may be used.

In the annexed drawings:

Figure 1 shows a top assembly view of a preferred form of the present invention with a piece of the sanding belt stock in place ready to be cut diagonally.

Figure 2 shows a side view of the assembly of Figure 1, with a preferred form of the cutting knife in its normal hand-held cutting position with part of the cut made, and with the clamping members shown in clamping position in solid lines, the partially lifted position of the clamping members being shown in dotted lines.

Figure 3 shows a sectional end view as taken at line 3—3 of Figure 1, looking in the direction of the arrows.

Figure 4 shows in fragmentary perspective view the typical appearance of a spliced and cemented belt clamped ready for the setting-up of the splice.

Figure 5 shows one of the clamping members which is usable as either the top or bottom member of the Figure 4 assembly.

Referring more particularly to Figures 1, 2, and 3 of the drawings it will be noted that the cutting and splicing assembly 1 has a base member 2 and a back member 3 which has a recess 4. Projecting forward from the upper portion of back plate 3, at an angle therewith corresponding approximately with the belt splice angle, are a pair of substantially parallel and suitably spaced apart support members 5 and 6. Those support members, for rigidity, are preferably angular in cross section, with one side of each of said angles being outturned and forming the top or platform of the support members, and with the other side of each angle member facing each other and forming the sides of a channel in which a knife guide member 7 can be mounted. Welded crosswise of the lower edge of the upstanding flanges of support members 5 and 6 are tie members 8, 9, and 10 which not only rigidly hold support members 5 and 6 in spaced relation, but form a support for knife guide member 7.

Knife guide member 7 is preferably made of wood, or other suitable light weight material to facilitate ease of handling, and of a size to closely but freely fit between the adjacent flanges of support members 5 and 6 while its upper surface is held substantially flush with the upper flanged surface of these support members. On the top face of knife guide member 7 are a pair of knife guide strips 11 and 12 which are preferably formed from steel and anchored in spaced relation by means of screws 13, or the like. The particular spacing chosen for strips 11 and 12 depends to a considerable extent upon the particular knife to be used. For instance, a knife 14, as shown in Figure 2, and which has a thin edged rotary blade 15, functions especially well in cutting sanding belt stock when the space between knife guide strips 11 and 12 is approximately 3/64". Directly below and full length of the slot between strips 11 and 12 is a recess 16 of suitable size to allow the edge of rotary blade 15 to pass thereinto and also to receive any loose particles released during the cutting operation. Stop members 17 fastened on the under face of knife guide member 7 at opposite sides of tie members 8 and 10 act to hold knife guide member 7 in substantially fixed position against endwise movement.

Mounted on back plate 3 are a pair of hinge brackets 18 and 19, and mounted on these brackets, by means of hinge arms 20 and 21, are a pair of clamping members 22 and 23. These arms can be moved about their pivot end, for instance as is shown in dotted lines in Figure 2, to facilitate the insertion of the strip stock for sanding belt 24 ready for cutting to length and also when the ends of the sanding belt are to be spliced.

The spliced belt end clamping assembly 25, Figure 4, is provided with upper and lower clamping members 26 and 27, which for convenience may be made of like size. These clamping members may be gripped together by means of C-clamps 28, as shown, for holding the spliced ends of the sanding belt until the cement sets up.

To cut a sanding belt, the free end of the roll (not shown) of belt stock 24 is trued, if necessary, by placing the side of the belt against back member 3 and checking the angle of the end with the angle of the slot between knife guide strips 11 and 12. With the end cut at the proper angle, the belt stock is measured and marked to obtain the proper length required for the endless belt to be produced, and then the belt stock, with clamping members 22 and 23 raised, is mounted over support members 5 and 6 with the side edge of the sanding belt stock up against back member 3, and the whole belt stock shifted endwise until the marked spot on the belt coincides with the cutting slot in knife guide member 7. Clamping members 22 and 23 are then lowered for use in firmly gripping and holding the sanding belt stock in cutting position. Any suitable knife 14 is then used to sever the piece of sanding belt stock from the supply roll of same. With the belt stock thus cut to length, the ends of same are next skived to remove the abrasive coating from the end portion of the belt stock in the area of both ends which are to be overlapped during the splicing operation.

For splicing this piece of sanding belt stock it is first threaded between base member 2 and the under side of support members 5 and 6, for instance in the position as diagrammatically shown in Figure 2. Clamping members 22 and 23 are again turned back out of the way, and knife guide member 7 removed and lower clamping member 27 inserted in its place between the flanges of support members 5 and 6. One end of the sanding belt, for instance the one at the left, is then brought up over support member 5 with the abrasive face up and with the skived end of the belt stock substantially centered on the upper face of the lower clamping member 27. Clamping member 22 is then brought down to the holding position shown in Figure 2, and the other skived end of the sanding belt stock is brought up over support member 6 and the skived portions of the two ends fitted over each other to form the overlapped cementing area. Clamping member 23 is then brought down to the clamping position shown in Figure 2. Clamping members 22 and 23 thus act to hold sanding belt 24 in cementing position over clamping member 27. It should be noted at this point that the side edges of the ends of the belt above support members 5 and 6 and the side edge of the belt in its return run below them is up against back member 3 which acts as a stabilizing guide facilitating the making of a perfectly aligned joint. It is also to be noted that the return run of the sanding belt to be spliced is out of the way during the splicing operation since it freely rests below the splicing area. With the ends of the belt thus held in true splicing position above lower clamping member 27, suitable cement is applied to the sanding belt in the overlapped area and upper clamping member 26 placed above the joint. C-clamps 28 are then used to grip the opposite ends of upper and lower clamping members 26 and 27 as shown in Figure 4, and hold the cemented joint firmly in position. Notch 4 in back plate 3 and the space from back plate 4 up to tie member 8 facilitates this clamping, as does the space from the free end of support members 5 and 6 up to tie member 10. Clamping members 22 and 23 are then turned back out of the way and the clamping assembly 25 lifted out of the machine and taken to a point where the cement is allowed to thoroughly set-up ready for use of the belt. Knife guide member 7 is then replaced in the position shown in Figures 1, 2, and 3 whereupon the apparatus is ready for repeating the splicing cycle set forth above.

Other modes of applying the principle of my invention may be employed instead of the one explained, change being made as regards the cutting and splicing apparatus herein disclosed, provided the means stated by any of the following claims or the equivalent of such stated means be employed.

I therefore particularly point out and distinctly claim as my invention:

1. A cutting and splicing apparatus for belts, which comprises a base member, an upright back portion rising from said base member, a substantially horizontal stationary belt-supporting means projecting forwardly from said back portion in elevated position with respect to the plane of said base member and providing for the passage of a belt under said belt-supporting means when the ends of said belt are placed on said supporting means, said belt-supporting means having a channel in its upper face, a knife guide member closely fitting and removably mounted in said channel and comprising an elongated bar having a flat top surface substantially flush with the upper face of the supporting means and having a knife-receiving groove in its upper side, a knife guide strip at each side of said groove with the groove extending downwardly into said bar below and between said guide strips, said knife guide member being at an angle with said upright back portion corresponding substantially with the crosswise angle at which the ends of said belt are to be spliced together, and clamping means adapted to normally rest on said belt-supporting means adjacent to and at opposite sides of said channel for holding said belt during the cutting and splicing of same.

2. A cutting and splicing apparatus for belts as set forth in claim 1, wherein said clamping means is in the form of a pair of individually elevatable clamping members hingedly mounted at one end on said upright back portion.

3. A cutting and splicing apparatus for belts as set forth in claim 1, wherein said upright back portion extends above and below said belt-supporting means to provide upper and lower guides for a side edge of a belt during the splicing of same.

4. A cutting and splicing apparatus for belts as set forth in claim 1, wherein said clamping means is in the form of a pair of individually elevatable clamping members hingedly mounted at one end on said upright back portion which extends above and below said belt-supporting means to provide upper and lower guides for a side edge of a belt during the splicing of same.

5. A cutting and splicing apparatus for belts, which comprises a base member, an upright back plate mounted on said base member, a substantially horizontal stationary belt-supporting means projecting forwardly from and anchored in a plane substantially perpendicular to said upright back plate in elevated position over said base member and in position for providing for the passage of the intermediate portion of a belt under said belt-supporting means when the ends of said belt are placed on said supporting means, said belt-supporting means having a substantially flat upper surface with an upwardly opening channel therein, a knife guide member closely fitting and removably mounted in said channel with said knife guide member being at an angle with said back plate corresponding substantially with the crosswise angle at which the ends of said belt are to be spliced together, said channel in said belt-supporting means having support means fixed thereto at the bottom thereof on which said knife guide can rest with its upper face substantially flush with the upper surface of said belt-supporting means, and belt-clamping means adapted to normally rest on said belt-supporting means at opposite sides of said channel for holding said belt during the cutting and splicing of same, said upright back plate extending above and below said belt-supporting means in position to act as an edge guide for the upper and lower portions of said belt during the cutting and splicing of same.

6. A cutting and splicing apparatus for belts as set forth in claim 5, wherein said clamping means is in the form of a pair of individually elevatable clamping members, each of which has a hinge at one end with such hinge fastened to said upright back plate so as to leave the latter available to act as an edge guide for said belt during the cutting and splicing of same.

7. A cutting and splicing apparatus for belts as set forth in claim 5, wherein said belt-supporting means is in the form of a pair of angles with one outer face of each angle forming a side for said channel and the other face of each angle turning outward and forming the substantially flat upper face of said belt-supporting means, said belt-supporting means having tie members rigidly fastened to the under face of same to form the bottom of said channel.

8. A cutting and splicing apparatus for belts as set forth in claim 5, wherein said knife guide member has a pair of knife guide strips extending lengthwise thereof and spaced apart sufficiently to form a slot to receive and guide a knife blade during the cutting of the belt, there being a recess under said knife guide strips directly under the knife-receiving slot between them so that the knife blade can extend thereinto during belt cutting, and loose material released during the cutting can drop thereinto.

9. A cutting and splicing apparatus for belts as set forth in claim 5, wherein said belt-supporting means is in the form of a pair of angles with one outer face of each angle forming a side for said channel and the other face of each angle turning outward and forming the substantially flat upper face of said belt-supporting means, said belt-supporting means having tie members rigidly fastened to the under face of same to form the bottom of said channel, and wherein said knife guide member adapted to fit in said channel has a pair of knife guide strips extending lengthwise thereof and spaced apart sufficiently to form a slot to receive and guide a knife blade during the cutting of the belt, there being a recess under said knife guide strips directly under the knife-receiving slot between them so that the knife blade can extend thereinto during belt cutting, and loose material released during the cutting can drop thereinto.

WILLIAM D. DAIN.

References Cited in the file of this patent

UNITED STATES PATENTS

| Number | Name | Date |
|---|---|---|
| 1,217,253 | Williamson | Feb. 27, 1917 |
| 2,069,362 | Ford | Feb. 2, 1937 |
| 2,273,463 | Campbell et al. | Feb. 17, 1942 |
| 2,446,576 | De Vry | Aug. 10, 1948 |
| 2,522,346 | Carson et al. | Sept. 12, 1950 |
| 2,575,798 | Dain | Nov. 20, 1951 |